United States Patent [19]

Jingu

[11] Patent Number: 5,060,168
[45] Date of Patent: Oct. 22, 1991

[54] METHOD AND APPARATUS FOR CONTROLLING RASTER SCAN PRINTER

[75] Inventor: Kunio Jingu, Hitachi, Japan
[73] Assignee: Hitachi, Ltd., Tokyo, Japan
[21] Appl. No.: 228,012
[22] Filed: Aug. 4, 1988

[30] Foreign Application Priority Data

Aug. 12, 1987 [JP] Japan ................ 62-199774

[51] Int. Cl.$^5$ ............................ G06F 15/20
[52] U.S. Cl. .................... 364/519; 340/799
[58] Field of Search ............... 364/519, 520, 900; 365/180, 230, 219-221; 340/750, 798-800

[56] References Cited

U.S. PATENT DOCUMENTS

| | | | |
|---|---|---|---|
| 4,467,443 | 8/1984 | Shima | 364/900 |
| 4,675,833 | 6/1987 | Cheek et al. | 364/523 |
| 4,677,574 | 6/1987 | Kausch | 364/521 |
| 4,694,405 | 9/1987 | Bradbury et al. | 364/518 |
| 4,773,026 | 9/1988 | Takahara et al. | 364/518 |

FOREIGN PATENT DOCUMENTS 92072 6/1983 Japan.
100472 5/1986 Japan.

OTHER PUBLICATIONS

American Heritage Dictionary, 1982, p. 603.

*Primary Examiner*—Heather R. Herndon
*Attorney, Agent, or Firm*—Antonelli, Terry, Stout & Kraus

[57] ABSTRACT

A control apparatus for a raster scan printer has a bit map memory for storing bit information corresponding to print dots, input means for writing the bit information into the bit map memory, sending means for reading the bit information from the bit map memory and sending it to the raster scan printer, and a central processing unit for controlling the apparatus. The address of the bit map memory ascends in a sheet feed direction and is consecutive in a raster scan direction. A control method includes the steps of storing bit information corresponding to print dots in a bit map memory sequentially in a sheet feed direction and consecutively in a raster scan direction, reading the bit information from the bit map memory in the raster scan direction and sending it to the raster scan printer, storing bit information corresponding to print dots into an area of the bit map memory from which the bit information has been read, and reading the latter bit information and sending it to the raster scan printer. The bit map memory is allotted to the print dots in a multiple manner to form a ring buffer system. In a software implementation, the writing and reading can be carried out without paying attention to a ring boundary. In a hardware implementation, no multiplier nor residue circuit is necessary and the configuration is simplified.

6 Claims, 6 Drawing Sheets

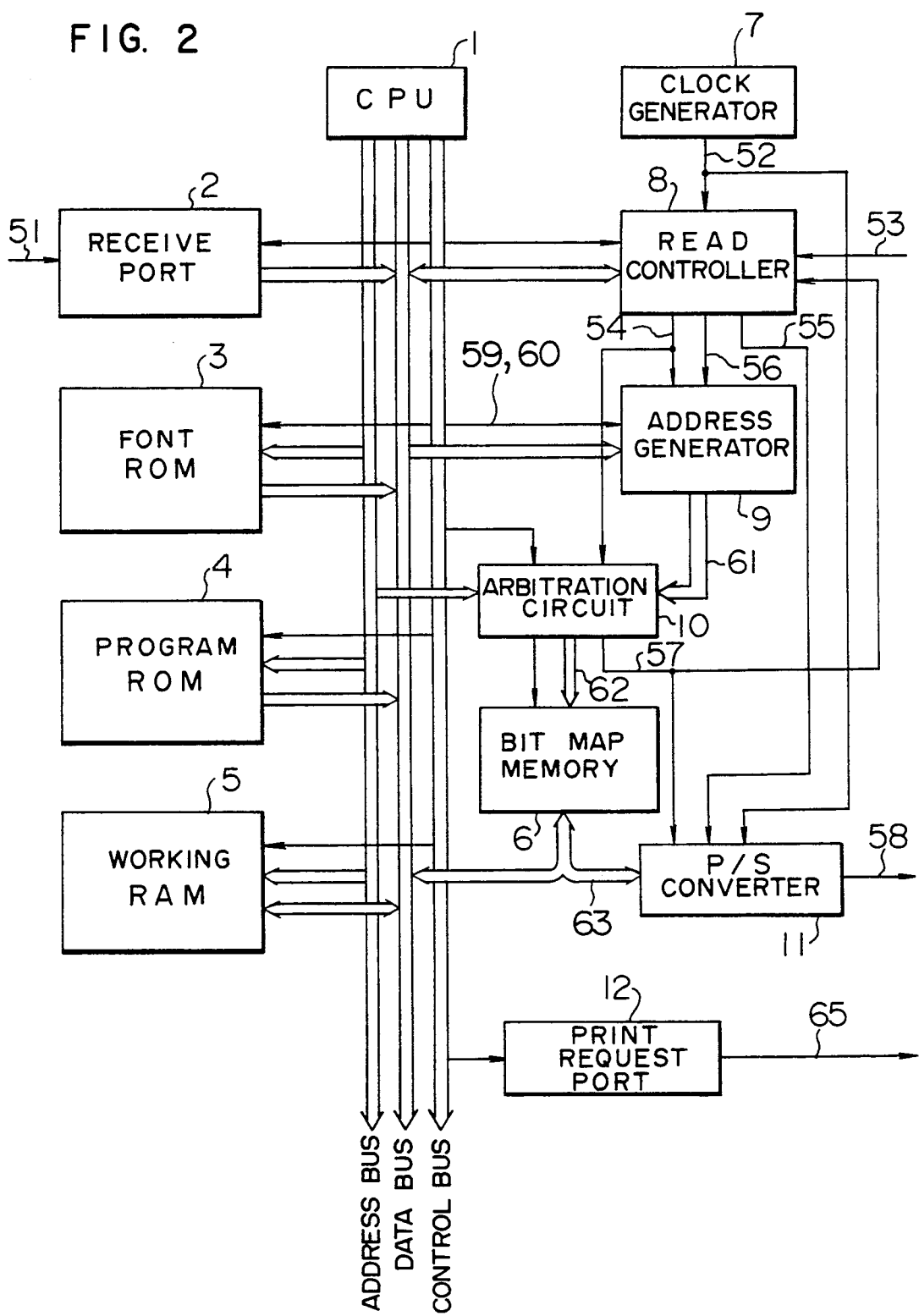

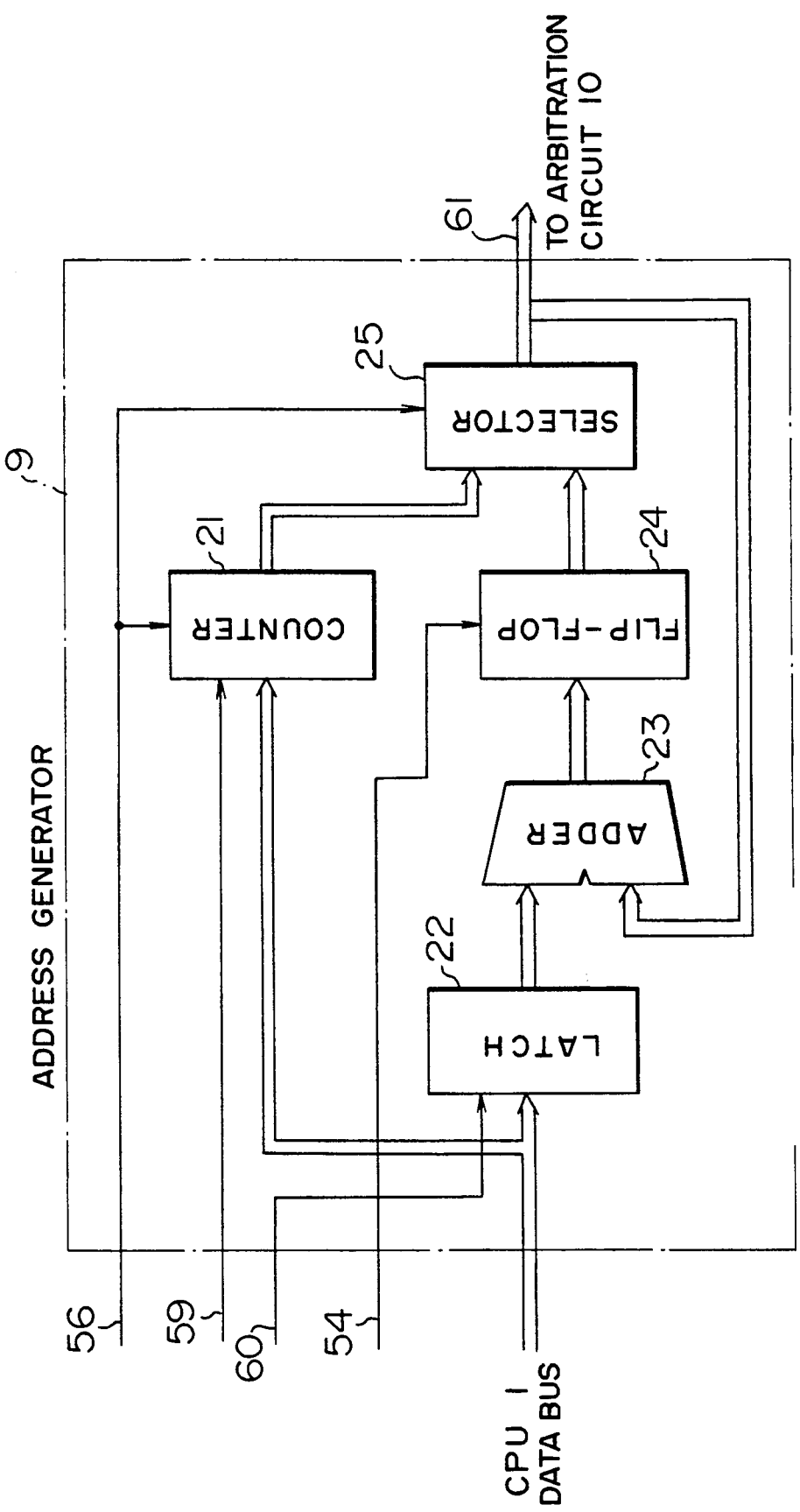

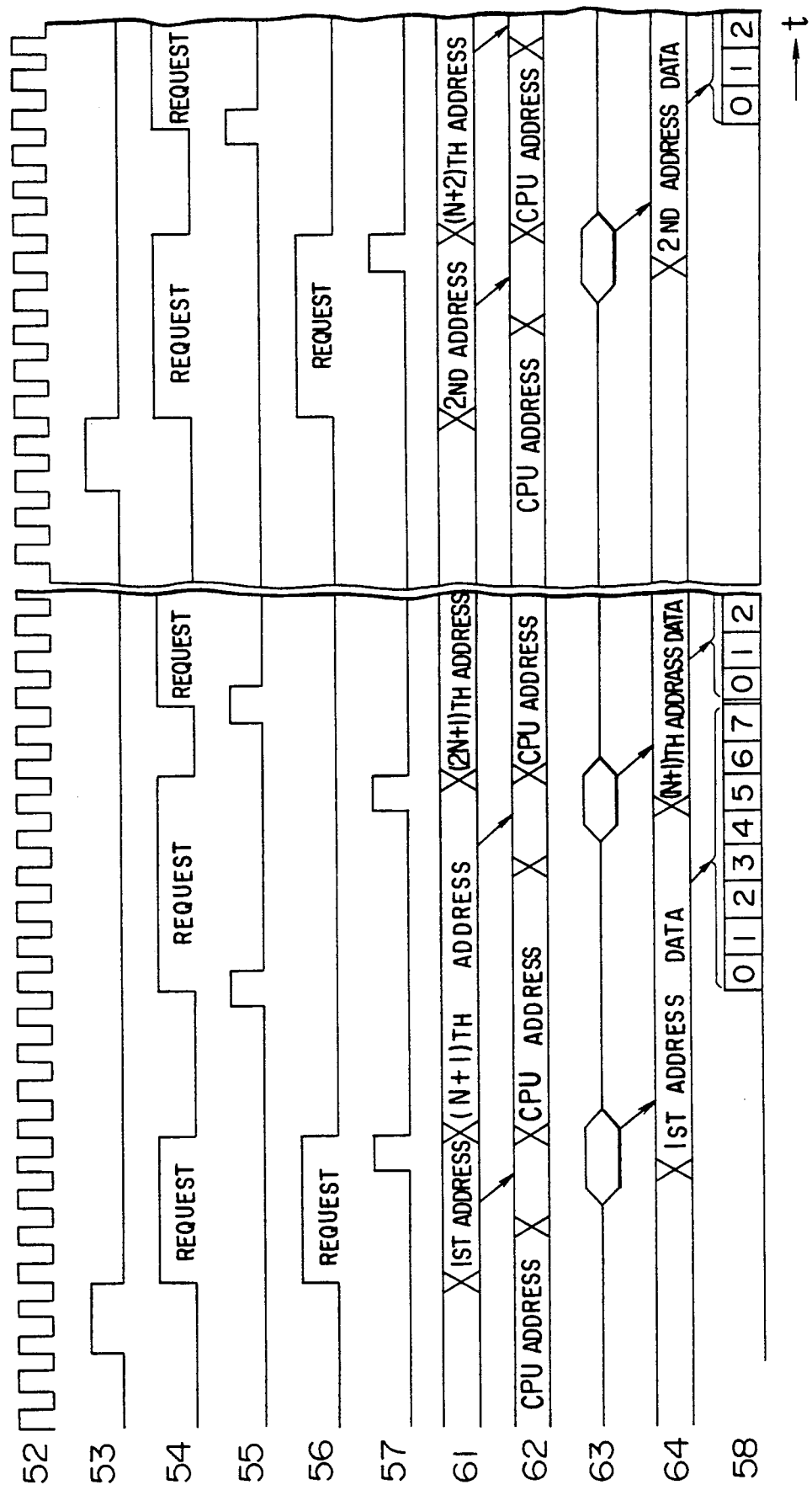

METHOD AND APPARATUS FOR CONTROLLING RASTER SCAN PRINTER

BACKGROUND OF THE INVENTION

The present invention relates to an apparatus for controlling a raster scan printer, and more particularly to an apparatus for controlling a raster scan printer having a bit map memory.

A printer having a high print quality and a low noise, such as a laser beam printer, has been used as a raster scan printer. Such a printer usually has a bit map memory in which print dots for printing a pattern or image data correspond to bit information are stored in the memory. Thus, the bit map memory needs a large capacity, for example, one megabyte in order to print on a size A4 sheet at a high print quality of 300 dots/inch.

A ring buffer system in which a bit map memory is structured as if it were a cylinder has been proposed. The content of the bit map area corresponding to the area which has been read for printing need no longer be stored. Thus, the memory capacity can be reduced by assigning the bits of the bit map memory to the print dots not in a one-to-one manner but in a multiple manner. For a raster scan printer having a print area of 1 words in a raster scan direction by m rasters in a sheet feed direction, a bit map memory having a capacity of 1 words in the raster scan direction by n rasters in the sheet feed direction is used in a manner that the n-th raster and the first raster are continuous so that the bit map memory is structured as if it is a cylinder having a circumference of n rasters. In the ring buffer type bit map memory, data corresponding to the first raster to the n-th raster at the leading edge of the sheet is first written into the bit map memory. The data is then sequentially read from the data corresponding to the first raster in the raster scan direction and it is sent to the printer for printing. Data of the (n+1)th raster is then written into the area of the bit map memory from which the data has been read. The writing into the bit map memory and the reading from the bit map memory are carried out in parallel while the area from which the data has been read is watched to complete one-page printing.

In order to assign data in a multiple manner to the bit map memory to structure it as if it were a cylinder, it is necessary to modify the write address when the data is written into the bit map memory, and to modify the read address when the data is read from the bit map memory. Specifically, depending on the number of times of crossing a boundary between the n-th raster and the first raster, the address must be modified as many times as the number of times of crossing so that the data corresponding to the (n+1)th raster is allocated to the data corresponding to the first raster of the bit map memory. An apparatus for carrying out such address modification by software control is disclosed in JP-A-61-100472, and an apparatus for carrying out address modification using hardware is disclosed in JP-A-58-92072.

However, in a prior art apparatus which carries out the address modification using software, the data must be written or read while attention is always given to the boundary between the n-th raster and the first raster. Accordingly, the processing speed is too low to follow the print speed of the printer.

In a prior art apparatus which carries out address modification using hardware, a multiplier and a subtractor are required. The multiplier circuit is of large scale. The subtractor is not a circuit to subtract a constant value but it is a circuit to allocate a raster to be written or read to one of the first to n-th rasters. Thus, it is actually a circuit to determine a residue and hence it is of large scale.

SUMMARY OF THE INVENTION

It is an object of the present invention to provide a ring buffer system for a bit map memory in which bits of the bit map memory are allocated to print dots in a multiple manner and the reading and writing of data may be carried out by software control without paying attention to the boundary of the ring so that the processing speed is not reduced, or by hardware implementation which does not require a multiplier or a residual circuit so that the construction is simplified.

In accordance with one feature of the present invention, an apparatus for controlling a raster scan printer comprises a bit map memory for storing bit information corresponding to print dots, input means for writing bit information into the bit map memory, send means for reading the bit information from the bit map memory and sending it to the raster scan printer, and a central processor for controlling those units. The address of the bit map ascends continuously in a sheet feed direction and consecutively in a raster scan direction.

In accordance with another feature of the present invention, a method for controlling a raster scan printer comprises the steps of storing bit information corresponding to print dots sequentially in a bit map memory in a sheet feed direction and consecutively in a raster scan direction, reading the bit information from the bit map memory in the raster scan direction and sending it to the raster scan printer, storing bit information corresponding to print dots into an area of the bit map memory from which the bit information has been read, and reading the bit information and sending it to the raster scan printer.

In accordance with a further feature of the present invention, an apparatus for controlling a raster scan printer, has a bit map memory in which print dots correspond to bit information and a bit sequence direction is in a raster scan direction and each word consists of a predetermined number of bits, and sends it to read character data from the bit map memory and the raster scan printer having a print area of l words in the raster scan direction by m rasters in a sheet feed direction. The address of the bit map memory ascends in the sheet feed direction, and a memory width of the bit map memory in the sheet feed direction is n rasters which are smaller than m rasters of the raster scan printer. An address of a word adjacent in the raster scan direction to a word under consideration is given by adding n rasters to the address of the word under consideration. A memory capacity of the bit map memory is larger than (.n words by a predetermined amount.

In the apparatus for controlling the raster scan printer of the present invention, data corresponding to the first to n-th rasters at the beginning of the sheet is written into the bit map memory. Then, the data is sequentially read starting from the data corresponding to the first raster and it is sent to the printer for printing. Data corresponding to the (n+1)th et seq raster is written into the area of the bit map memory from which the data has been read. The writing into and reading from the bit map memory are carried out in parallel while the area from which the data has been read is watched to complete one-page printing. Considering a write address of the bit map memory corresponding to the first word of the (n+1)th raster, data must be written into the first address in the prior art apparatus. As a result, the address modification by software or hardware is required. In the present invention, the data is directly written into the (n+1)th address and hence the address modification is not necessary. Since the (n+1)th address indicates a word adjacent in the raster scan direction to the first address, it is the area which has been read in the first raster read. The (n+1)th address is the next raster in the sheet feed direction to the n-th address. Accordingly, no address modification is required and the data may be directly written into the (n+1)th address. This is true for other addresses than the (n+1)th address. In the reading operation, the address modification is not necessary for the same reason.

BRIEF DESCRIPTION OF THE DRAWINGS

Preferred embodiments of the present invention will now be described in conjunction with the accompanying drawings, in which:

FIG. 2 shows an internal configuration of the overall control apparatus, FIG. 5 shows a configuration of an address generator in the control apparatus, FIG. 6 shows a print data read sequence in the control apparatus.

DESCRIPTION OF THE PREFERRED EMBODIMENTS

Figure 3:
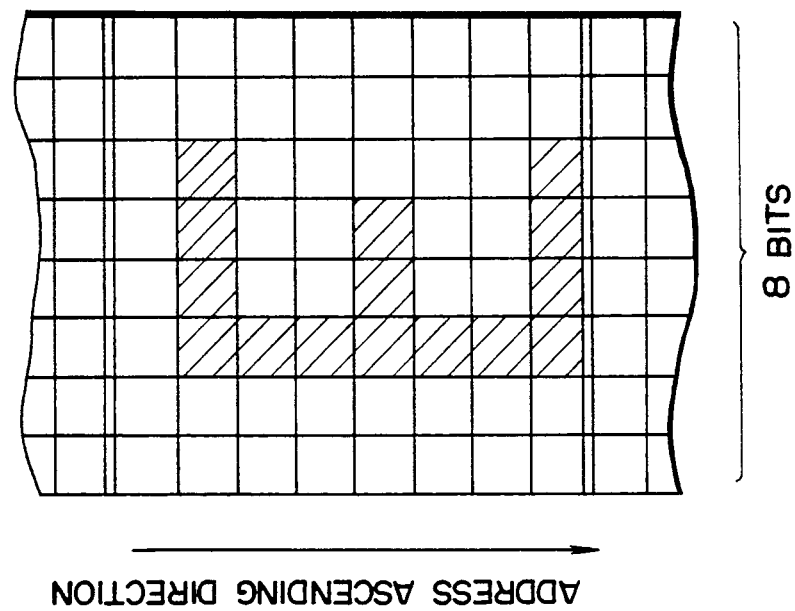
FIG. 3 shows a character font stored in a font ROM in the control apparatus.

One embodiment of the present invention is now described with reference to FIGS. 1 - 6. FIG. 2 shows a configuration of a control apparatus which receives an ASCII code from a host computer such as a personal computer, writes character data into a bit map memory based on the received ASCII code, reads the data from the bit map memory and sends it to a raster scan printer. A CPU 1 is a central processing unit of 8 bit (=1 word) type which controls the overall control apparatus. A receive port 2 receives an ASCII code 51 from the host computer. A font ROM 3 is a read-only memory which stores a character font as shown in FIG. 3. A program ROM 4 is a read-only memory which stores a program for instructing the CPU 1 for overall control apparatus. A working RAM 5 is a readable and writable random access memory which is used as a work area of the CPU 1. A bit map memory 6 is a readable and writable random access memory in which stores print dots correspond to bit information with each word consisting of 8 bits. A clock generator 7 generates a dot clock 52 corresponding to a one-dot print time of the printer. A read controller 8 manages a one-page print area of the printer based on print area management data sent from the CPU 1, the dot clock 52 and a horizontal synchronization signal from the printer, generates a read request signal 54 and a load signal 55 for the print data once for every 8 dot clocks, and generates a raster update request signal 56 for every raster. An address generator 9 generates a read address 61 when the print data is to be read from the bit map memory 6. An arbitration circuit 10 arbitrates the access by the CPU 1 and the access by the read control circuit 8 to the bit map memory 6. When the read control circuit 8 accesses the bit map memory 6, the arbitration circuit generates an enable signal 57 at a timing to make the read data effective. A P/S converter 11 is a parallel/serial converter which holds 8-bit memory data 63 read by the read control circuit 8, in response to the enable signal 57, loads it into a shifter by a load signal 55, and sends it to the printer as a video signal 58 while shifting it one bit at a time under control of the dot clock 52. A print request port 12 produces a print request signal 65. Thus, the control apparatus can control the raster scan printer to print data having a print area of l words in the raster scan direction by m rasters in the sheet feed direction.

Details of the bit map memory 6, address generator 9 and P/S converter 11 are now explained.

Figure 1:
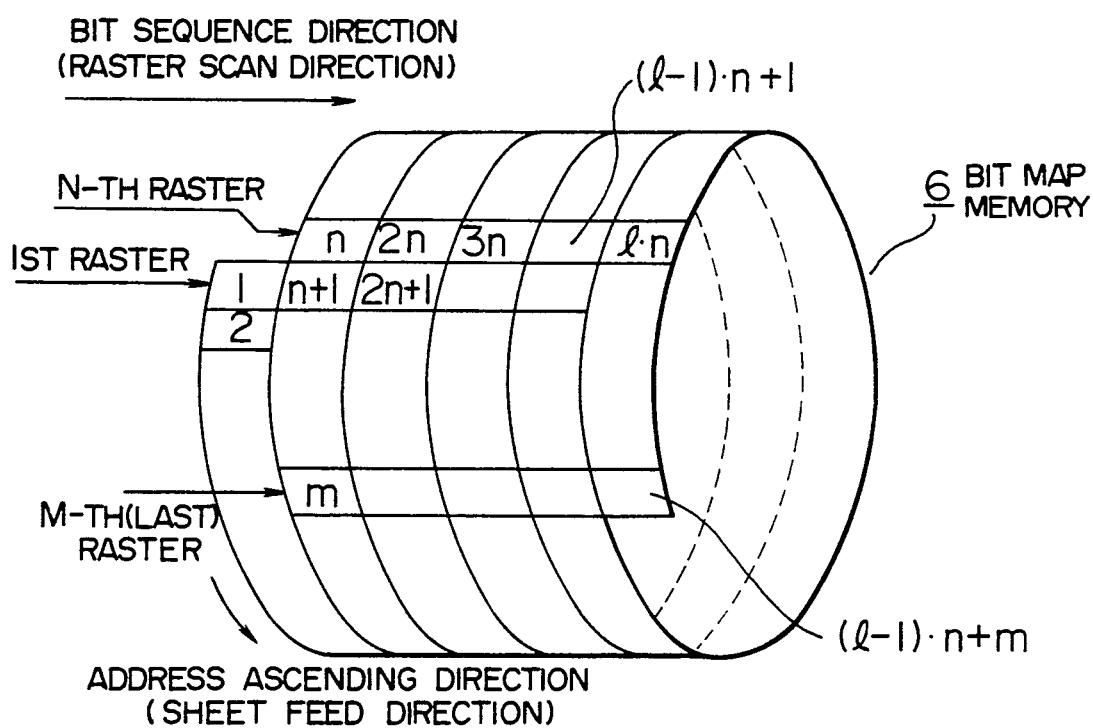
FIG. 1 shows a configuration of a bit map memory in an apparatus for controlling a raster scan printer of the present invention.

FIG. 1 shows a configuration of the bit map memory 6. It is of 8-bit configuration, the bit sequence direction is in the raster scan direction, and the address ascends in the sheet feed direction. A memory width in the sheet feed direction is n rasters. An address of a word adjacent in the raster scan direction to a word under consideration is given by adding n to the address of the word under consideration. The memory capacity is $(l-1) \cdot n + m$ words. The memory is structured as if it were helically wrapped around a cylinder of circumferential rasters.

FIG. 5 shows a configuration of the address generator 9. A counter 21 fetches data from the CPU 1 in response to a write signal 59. It is presettable and counts up in response to the raster update request signal 56. A latch 22 latches data supplied from the CPU 1 in response to the write signal 60. An adder 23 adds the output of the latch 22 and an output of a selector 25. A flip-flop 24 holds the output of the adder 23 in response to the read request signal 54. The selector 25 selects the output of the counter 21 when the raster update request signal 56 requests a raster update and selects the output of the flip-flop 24 in other cases to produce the read address 61.

Figure 4:
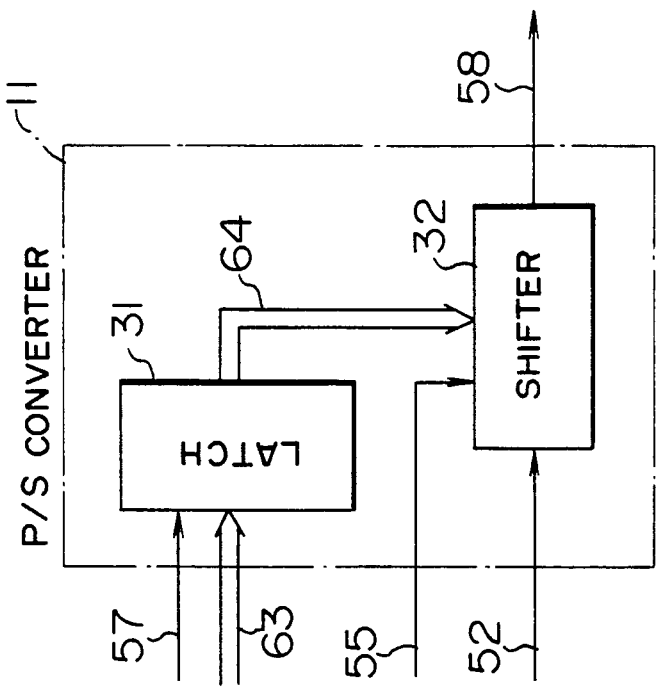
FIG. 4 shows a configuration of a P/S converter in the control apparatus.

FIG. 4 shows a configuration of the P/S converter 11. A latch 31 latches the 8-bit memory data 63 read from the bit map memory 6 in response to the enable signal 57. A shifter 32 loads the output of the latch 31 (read data 64) by the load signal 55, shifts it one bit at a time under control of the dot clock 52, and sends the video signal 58 to the printer.

The operation is now explained. The CPU 1 first writes into the read controller 8 a one-page print area of l words in the raster scan direction by m rasters in the sheet feed direction, writes into the counter 21 of the address generator 9 the address of the bit map memory 6 corresponding to the first word of the first raster of the sheet, that is, the value of the first address (value 1), by means of the write signal 59, and writes into the latch 22 the raster width n of the bit map memory 6 in the sheet feed direction, by the write signal 60.

The CPU 1 then receives the ASCII code 51 sent from the host computer, by way of the receive port 2, reads character font data corresponding to the ASCII code from the font ROM 3, and writes it into the bit map memory 6. The font ROM 3 is configured as shown in FIG. 3 and the bit map memory 6 is configured as shown in FIG. 1. Thus, the CPU 1 may simply increment the address by one at a time and the write operation is simplified. Characters are sequentially written into the bit map memory 6 in accordance with the received ASCII codes. When the data corresponding to the first raster to the n-th raster has been written into the bit map memory 6, the CPU 1 sends the print request signal 65 to the printer through the print request port 12. In response to this signal, the printer starts the printing and sends the horizontal synchronization signal 53 to the control apparatus each time the sheet is fed by one-raster distance. In response to this signal, the read control circuit 8 starts to read the print data from the bit map memory 6.

FIG. 6 shows a read sequence of the print data. The read operation is explained with reference to FIG. 6. In response to the horizontal synchronization signal 53 at the first raster, the control circuit 8 generates the read request signal 54 and the raster update request signal 56 in synchronizm with the dot clock 52. Thus, the read address 61 of the address generator 9 outputs the content of the counter 21 (value 1). On the other hand, the arbitration circuit 10 supplies the read address 61 as the memory address 62 if there is no access by the CPU 1 or if it has been completed, reads the data at the first address (memory data 63) from the bit map memory 6, and issues the enable signal 57 to indicate the validity of the data. In response to the enable signal 57, the latch 31 of the P/S converter 11 latches the memory data 63 so that the read data 64 does not change even if the memory data changes. This data is loaded into the shifter 32 in response to the load signal 55 which is generated once for every 8 dot clocks, shifted by one bit at a time by the dot clock 52, and sent to the printer as the video signal 58. On the other hand, the counter 21 is incremented at the falling edge of the enable signal 57 to produce a second address (value 2) in preparation for reading the second raster. The flip-flop 24 holds an output (value n+1) of the adder 23 which sums the read address 61 (value 1) and the content of the latch 22 (value n), at the falling edge of the enable signal 57 in preparation for reading the word adjacent in the raster scan direction. The read request signal 54 of the read control circuit 8 and the raster update request signal 56 are released by the enable signal 57. In this manner, the reading of the first word of the first raster is completed. For the second word of the first raster, the read control circuit 8 again generates the read request signal 54 at the eighth dot clock counter 1 from the previous request. The raster update request signal 56 is not generated this time. Accordingly, the content of the flip-flop (value n+1) is selected in the address generator 9 and the data at that address is read. In a similar manner, data is read until the l-th word of the first raster [(l-1)·n+1]th address is reached. The words after the l-th word are not read because the read control circuit 8 manages the print area and inhibits the reading. When the horizontal synchronization signal 53 of the second raster is generated, the data in the second address is read. The same is true for the following rasters. The CPU 1 writes the data of the (n+1)th raster et seq into the area of the bit map memory 6 corresponding to the rasters sequentially read. The CPU 1 monitors the management information number of input pulses of the horizontal synchronization signal 53 of the print area of the read control circuit 8 to determine up to which raster the data has been read. Thereafter, the reading and writing of the bit map memory are carried out in parallel up to the m-th raster to complete one-page printing. Considering the address of the bit map memory 6 corresponding to the first word of the (n+1)th raster, it is the first address in the prior art cylindrical system while it is the (n+1)th address in the helical system of the present embodiment. Accordingly, address modification is not necessary in the present embodiment as opposed to the prior art system, and the data can be directly read and written. The data of the (n+1)th raster is written after the data of the first raster has been read, and the data at the (n+1)th address of the bit map memory 6 is read at the time of writing because the (n+1)th address of the bit map memory 6 is the second word of the first raster. Since the bit map memory 6 is allotted in a multiple manner while the data is shifted by one word in the raster scan direction for every n rasters as shown in FIG. 1, an (m-n)word memory is added following the (l·n)th address so that the bit map memory 6 has a capacity of [(l-1)·n+m] words.

In accordance with the present embodiment, the bit map memory 6 is allotted to the print dots in a multiple manner to form a ring buffer system, and no attention need be paid by the software to a boundary of the ring in reading and writing the data. Accordingly, the processing speed is not reduced. When a hardware implementation is used, the address generator 9 for the read operation may be a simple circuit.

Figure 7:
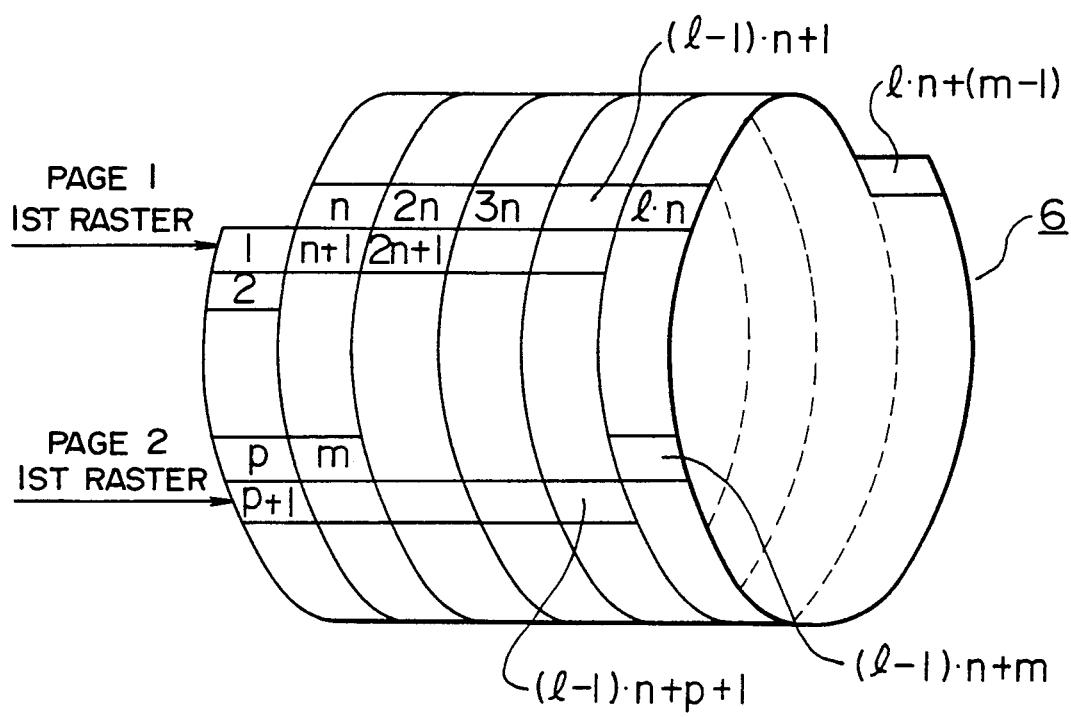
FIG. 7 shows a configuration of a bit map memory in another embodiment of the control apparatus.

Another embodiment of the present invention is explained with reference to FIG. 7. If m is not divided without residue but has a residue p, the last raster on page 1 corresponds to p-th raster in the bit map memory 6 and there is a vacant area of (n-p) rasters in the bit map memory 6. If the address of the bit map memory 6 corresponding to the first word of the first raster is written into the counter 21 of the address generator 9 as the first address, the writing of the page 2 is delayed until after the printing (reading) of the page 1 is completed. By controlling the bit map memory 6 such that the address may be set at any point between the first address and the n-th address of the bit map memory 6 so that the address of the bit map memory 6 corresponding to the first word of the first raster of the page 2 is set at the (P+1)th address, the writing of the page 2 can be consecutively carried out following to the writing of the page 1. The same is true for the page 3 et seq. The capacity of the bit map memory is [l·n+(m-1)] words which is (n-1) words larger than the memory capacity of the previous embodiment, in consideration of a case where the address is the set to the maximum one, that is, n-th address.

In accordance with the present embodiment, when a plurality of pages are to be continuously printed, the writing of two consecutive pages can be continuously carried out, and high speed printing is attained.

In accordance with the present invention, the bit map memory is allotted to the print dots in a multiple manner to form a ring buffer system, while the bit map memory is helically structured so that writing and reading are attained without paying attention to the boundary of the ring. Thus, in the software implementation, address modification is not necessary as opposed to the prior art cylindrical structure and the processing speed is not reduced. In the hardware implementation, the construction is simple.

I claim:

1. An apparatus for controlling a raster scan printer comprising:

a bit map memory for storing bit information corresponding to print dots with a bit sequence direction being in a raster scan direction, said bit map memory being in the form of a helical ring to permit said bit information to be stored in a sequential manner in said bit map memory; and means for reading said bit information from said bit map memory and sending said bit information to the raster scan printer having a print are of words in the raster scan direction by m rasters in a sheet feed direction;

wherein addresses of said bit map memory ascend in the sheet feed direction along said helical ring;

wherein a memory width of said bit map memory in the sheet feed direction is n rasters which is smaller than m rasters of said raster scan printer;

wherein an address of a word adjacent in the raster scan direction to another word under consideration of the bit map memory is given by adding n rasters to the address of the word under consideration;

wherein a memory capacity of said bit map memory is a predetermined amount larger than l·n words; and wherein each ring of said helical ring is shifted by one word every n rasters in the raster scan direction.

2. An apparatus for controlling a raster scan printer comprising:

a bit map memory for storing bit information corresponding to print dots with a bit sequence direction in a raster scan direction, said bit map memory being in the form of a helical ring to permit said bit information to be stored in a sequential manner in said bit map memory; and means for reading said bit information from said bit map memory and sending said bit information to the raster scan printer having a print area of words in the raster scan direction by m rasters in a sheet feed direction;

wherein addresses of said bit map memory ascend in the sheet feed direction along said helical ring;

wherein a memory width of said bit map memory in the sheet feed direction is n rasters which is smaller than m rasters of said raster scan printer;

wherein an address of a word adjacent in the raster scan direction to another word under consideration of the bit map memory is given by adding n rasters to the address of the word under consideration;

wherein an address for the first word of the first raster of the bit map memory is given by a residual address of m rasters and n rasters, plus one;

wherein a memory capacity of said bit map memory is a predetermined amount larger than $(-1) \times (n+m)$; and wherein each ring of said helical ring is shifted by one word every n rasters in the raster scan direction.

3. A method for controlling a raster scan printer comprising the steps of:

storing bit information corresponding to print dots in a bit map memory sequentially in a sheet feed direction and consecutively in a raster scan direction, said bit map memory being in the form of a helical ring to permit said bit information to be stored in a sequential manner in said bit map memory;

reading said bit information from said bit map memory in the raster scan direction and sending the bit information to said raster scan printer;

storing bit information corresponding to print dot into an area of said bit map memory from which bit information has been read; and reading the latter bit information and sending the latter bit information to said raster scan printer.

4. A method for controlling a raster scan printer according to claim 3 wherein said bit map memory has a memory capacity of $(l \times n) + (m-1)$.

5. A method for controlling a raster scan printer comprising the steps of:

temporarily storing one part of dot data to be printed in a bit map memory having a memory capacity less than $l \times m$ bits, said raster scan printer having a printable area of dot data of words in a raster scan direction by m rasters in a sheet feed direction, said bit map memory being in the form of a helical ring to permit said bit information to be stored in a sequential manner in said bit map memory;

reading said dot data from said bit map memory and supplying said dot data to said raster scan printer, and simultaneously storing a remaining part of the dot data to be printed in a region of said bit map memory where said reading and supplying operation is finished; and reading said remaining part of dot data from said bit map memory after said reading and supplying operation and supplying said remaining part of dot data to the raster scan printer;

wherein said bit map memory is used for storing dot data to be printed so that an address increasing direction of said bit map memory corresponds to said sheet feed direction, and first parts from a top to n rasters in the sheet feed direction are partitioned as a first print area, and the dot data of $l \times m$ bits to be printed are assigned and stored in addresses of the bit map memory in the raster scan direction in word units in each of said first parts along said helical ring;

wherein said dot data is successively read in the raster scan direction and is supplied to the raster scan printer and then second parts after $n+1$ rasters in the sheet feed direction are partitioned as a second print area, and the dot data of $l \times m$ bits to be printed are assigned and stored in addresses of the bit map memory in the raster scan direction in word units in each of said second parts;

wherein said dot data is successively read in the raster scan direction and is supplied to the raster scan printer; and wherein each ring of said helical ring is shifted by one word every n rasters in the raster scan direction.

6. A method for controlling a raster scan printer according to claim 5, wherein:

said dot data in the second print area is successively stored in the bit map memory after having read the dot data in the first print area.

* * * * *